(12) United States Patent
Kokku et al.

(10) Patent No.: US 8,873,482 B2
(45) Date of Patent: Oct. 28, 2014

(54) METHOD AND SYSTEM FOR VIRTUALIZING A CELLULAR BASESTATION

(75) Inventors: Ravindranath Kokku, Monmouth Jct, NJ (US); Rajesh Mahindra, Highland Park, NJ (US); Honghai Zhang, Ewing, NJ (US); Sampath Rangarajan, Bridgewater, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 256 days.

(21) Appl. No.: 13/037,442

(22) Filed: Mar. 1, 2011

(65) Prior Publication Data

US 2012/0051296 A1 Mar. 1, 2012

Related U.S. Application Data

(60) Provisional application No. 61/309,113, filed on Mar. 1, 2010.

(51) Int. Cl.
H04W 4/00 (2009.01)
H04W 28/26 (2009.01)
H04W 28/20 (2009.01)
H04W 72/12 (2009.01)

(52) U.S. Cl.
CPC .............. *H04W 28/26* (2013.01); *H04W 28/20* (2013.01); *H04W 72/121* (2013.01)
USPC ........... 370/329; 370/352; 370/356; 370/355; 370/225; 370/442; 455/133; 455/62; 455/67.11

(58) Field of Classification Search
USPC .......... 370/352–356, 329, 225, 442; 455/133, 455/62, 67.11
See application file for complete search history.

(56) References Cited

U.S. PATENT DOCUMENTS

| | | | |
|---|---|---|---|
| 2005/0213566 A1* | 9/2005 | Jutila et al. ................... | 370/352 |
| 2006/0083205 A1* | 4/2006 | Buddhikot et al. .......... | 370/338 |
| 2007/0086457 A1* | 4/2007 | Rune et al. ................... | 370/390 |
| 2007/0116029 A1* | 5/2007 | Di Lodovico et al. ....... | 370/442 |
| 2007/0195787 A1* | 8/2007 | Alnuweiri et al. ......... | 370/395.4 |
| 2007/0197222 A1* | 8/2007 | Rune ........................... | 455/436 |
| 2007/0201369 A1* | 8/2007 | Pedersen et al. ............ | 370/235 |
| 2007/0298788 A1* | 12/2007 | Corson et al. ................ | 455/433 |
| 2009/0007246 A1* | 1/2009 | Gutowski et al. ................ | 726/6 |
| 2009/0016275 A1* | 1/2009 | Liu et al. ........................ | 370/329 |
| 2009/0149221 A1* | 6/2009 | Liu et al. ........................ | 455/561 |
| 2009/0154413 A1* | 6/2009 | Kim et al. ...................... | 370/329 |
| 2009/0154415 A1* | 6/2009 | Park et al. ...................... | 370/329 |
| 2009/0252124 A1* | 10/2009 | Yeo et al. ....................... | 370/336 |
| 2010/0017861 A1* | 1/2010 | Krishnaswamy et al. ........ | 726/7 |
| 2010/0192212 A1* | 7/2010 | Raleigh ............................ | 726/7 |
| 2012/0087238 A1* | 4/2012 | Nakao et al. .................. | 370/225 |

* cited by examiner

*Primary Examiner* — Khaled Kassim
(74) *Attorney, Agent, or Firm* — Joseph Kolodka

(57) ABSTRACT

A network virtualization method in a wireless communication system includes aggregating sets of uplink and downlink flows on a cellular basestation into groups; allocating wireless resources to each of the sets as a respective basestation slice; and enabling each of the sets of flows to be under a distinct administrative entity.

5 Claims, 3 Drawing Sheets

METHOD AND SYSTEM FOR VIRTUALIZING A CELLULAR BASESTATION

This application claims the benefit of U.S. Provisional Application No. 61/309,313, entitled "NVS: A Virtualization Substrate for WiMax Networks", filed Mar. 1, 2010, and is related to U.S patent application Ser. No. 13/037,445, entitled "Method and System for Customizable Flow Management in a Cellular Basestation", filed Mar. 1, 2011, both of which are incorporated herein by reference.

BACKGROUND OF THE INVENTION

The present invention relates generally to wireless communications and more particularly to a method and system for virtualizing a cellular base station.

Network virtualization enables deploying customized services and protocols with diverse performance objectives in isolated slices on the same-shared physical network. Recently, virtualization of wireless network resources has started receiving increased focus. At least four different deployment scenarios benefit from effectively virtualizing wireless resources. Depicted in FIG. 1 and discussed below are four different deployment scenarios that benefit from effectively virtualizing wireless resources: Mobile Virtual Network Operators (MVNO) 101, FIG. 1 (*a*); Corporate Bundle Plans 101, FIG. 1 (*a*); Global Environment for Network Innovations (GENI) 102, FIG. 1 (*b*); and Services with Leased Networks (SLN) 103, FIG. 1 (*c*).

Mobile virtual network operators are emerging as strong players in the mobile network market to provide enhanced services such as video telephony, live streaming and interactive games (along with traditional voice services) to focused customers. This model is a win-win situation for both MVNOs and mobile network operators MNOs, since MVNOs help MNOs attract and retain a greater number of customers.

With corporate bundle plans, as revenue from voice services decreases rapidly, data services are receiving increased focus from WiMAX, 3G and LTE network operators. Already, more sophisticated data plans for revenue generation on 3G networks have emerged, and are constantly evolving. Many of these sophisticated data plans include corporate bundle plans where the bandwidth can be shared across a group of employees of a corporation.

Regarding global environment for network innovations GENI, virtualization can help MNOs and researchers by isolating wireless resources, and providing a way to deploy and test innovative ideas, while running operational networks. This provides a win-win situation for both network providers and researchers.

For services with leased networks SLNs, in the future, we envision that service providers would be increasingly interested in paying the network operators on behalf of the users to enhance users' quality of experience. For example, one can envision a maps service provider paying a network operator to reserve certain amount of bandwidth on base stations near highways for speeding up user requests.

Currently, there are no teachings on effective resource virtualization of cellular wireless base stations. Virtualization to date has focuses on 802.11 (Wi-Fi) technologies that are not applicable to cellular technologies. In a related domain, wired network virtualizations have been done in several ways, but their solutions do not fit wireless networks due to the inherent wireless domain characteristics such as channel fluctuations and capacity variations. Existing cellular base stations supporting virtual network operators (MVNOs) do not provide any isolation across different operators. They just allow the users of all the operators to access the resources uniformly.

Accordingly, there is a need for network virtualization that provides for effective virtualization of cellular base stations in technologies such as WiMAX and LTE.

BRIEF SUMMARY OF THE INVENTION

The present invention generally provides a method for network virtualization in a wireless communication system. The method includes aggregating sets of uplink and downlink flows on a cellular basestation into groups; allocating wireless resources to each of the sets as a respective basestation slice; and enabling each of the sets of flows to be under a distinct administrative entity.

In the preferred embodiment, the administrative entity is configured for requesting reservations for aggregate flows in terms of at least one of bandwidth and resources; the cellular basestation allows optimal co-existence of the reservations using normalized weight functions per slice that are computed differently for resourced-based and bandwidth-based types of the reservations. Preferably, the basestation enables the slices to perform at least one of customized slices for customized flow management functions and application optimizations. In the preferred embodiment, the customized flow management functions can be enabled either external to the basestation or within a basestation in a virtual machine or as a loadable module. Preferably, the co-existence is achieved when, at each time instant, the basestation schedules the slice with maximum weight. Further, in the preferred embodiment for the resource-based reservations, the weight is computed as one of reserved slots and average slots, where slots are a measure of resources such as a frequency subchannel or a time slot; and for bandwidth-based reservations, the weight is computed as one of a reserved bandwidth and an average bandwidth.

The present invention also provides for, in a wireless communication system, a network virtualization apparatus having means for aggregating sets of uplink and downlink flows on a cellular basestation into groups; means for allocating wireless resources to each of the sets as a respective basestation slice; and means for enabling each of the sets of flows to be under a distinct administrative entity These and other advantages of the invention will be apparent to those of ordinary skill in the art by reference to the following detailed description and the accompanying drawings.

DETAILED DESCRIPTION

The present invention is directed to network virtualization that would enable efficient deployment of customized services and protocols with diverse performance objectives in isolated slices on the same-shared substrate. The inventive network virtualization substrate NVS provides slice isolation with a utility-optimized resource allocation, and enables slices to perform customized resource management. Consequently, the NVS fosters the realization of diverse deployment scenarios such as well-isolated virtual services, virtual networks, and corporate networks.

Figure 1:
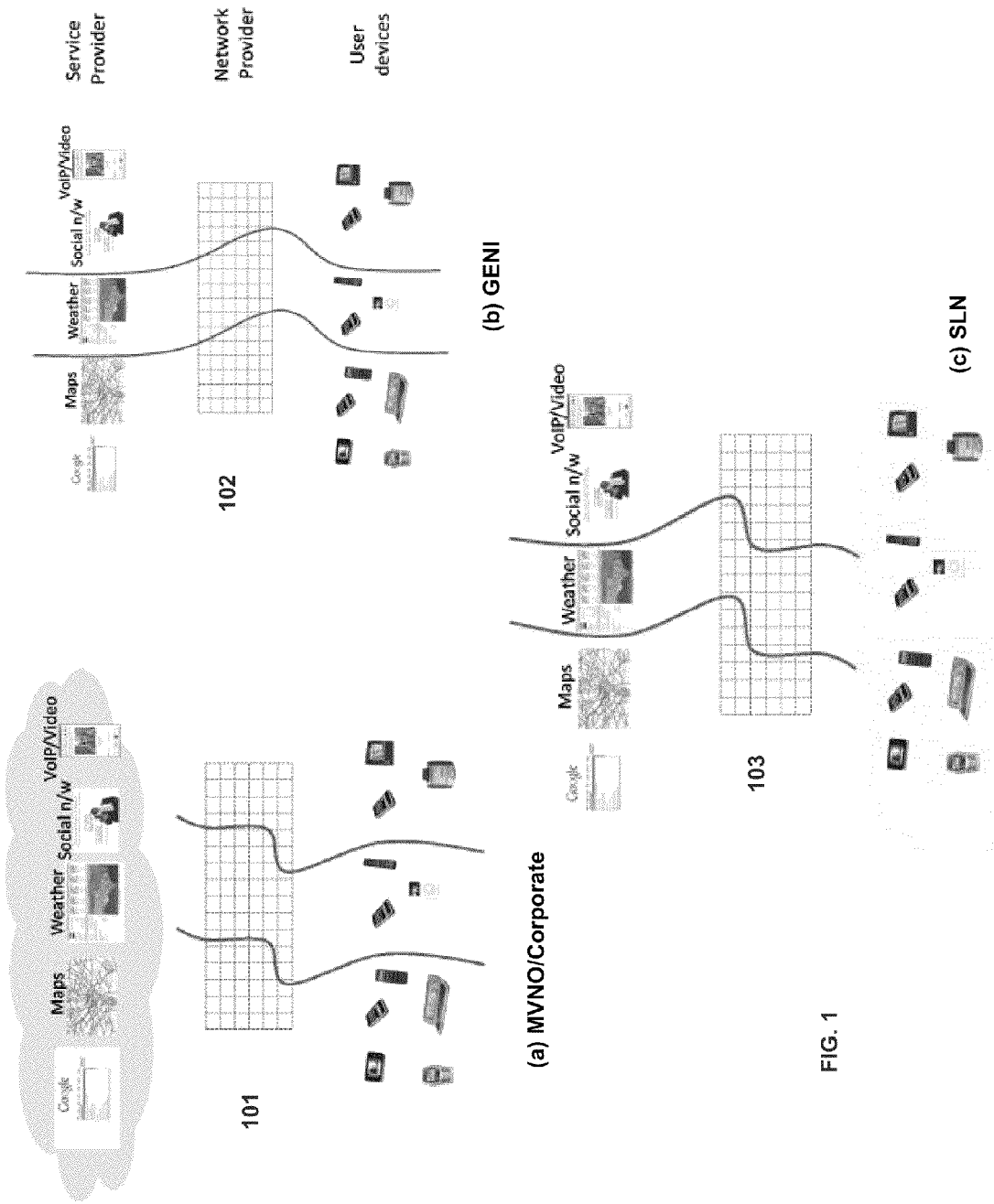
FIG. 1 is depicts exemplary deployment scenarios that benefit from virtualizing wireless resources in accordance with the invention: (a) Mobile Virtual Network Operators (MVNO) and Corporate bundle plans; (b) Global Environment for network Innovations (GENI); and (c) Services with Leased Networks (SLN)
Figure 2:
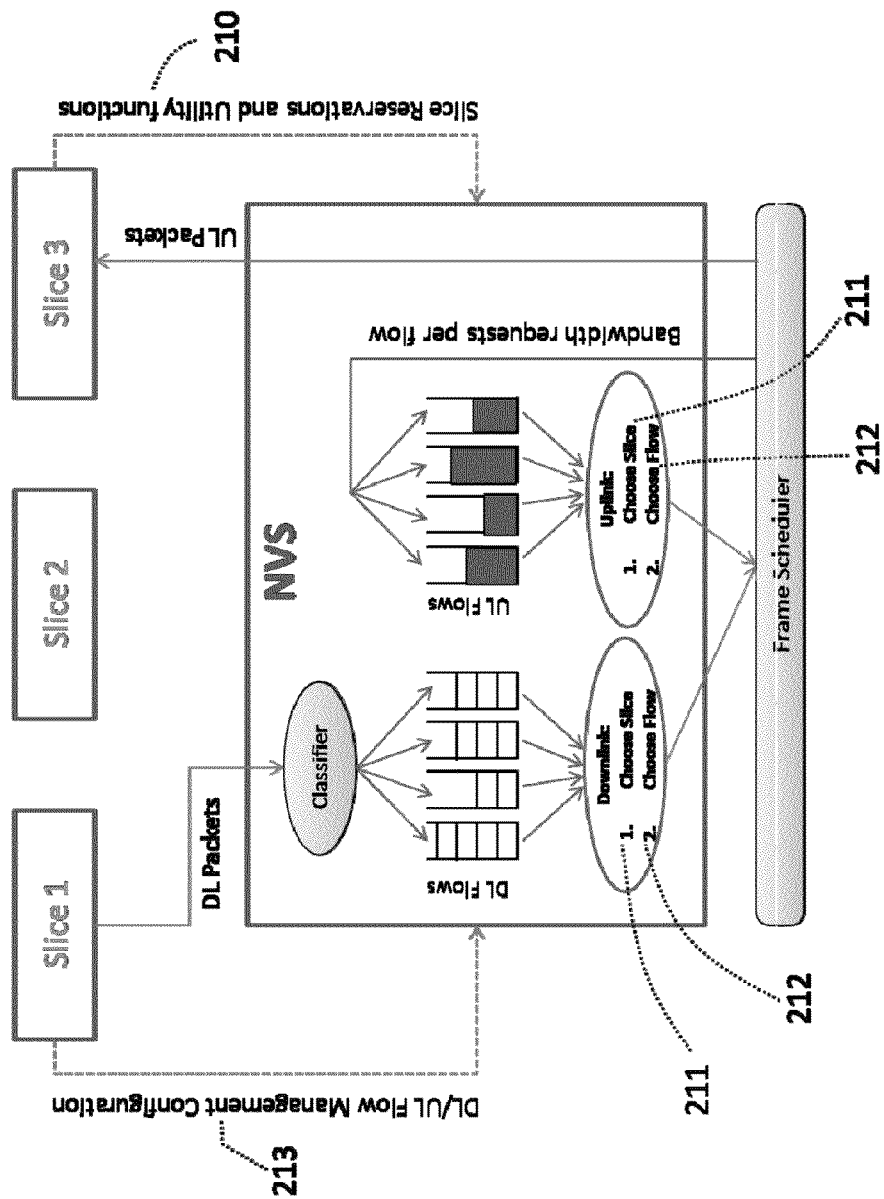
FIG. 2 is an exemplary diagram of slice scheduling for network virtualization in accordance with the invention.

Referring now to FIG. 2, there is shown a block diagram of a slice scheduler of the network virtualization substrate NVS. The slice scheduler components are denoted by references 210-213. The Network Virtualization Substrate NVS includes a classifier through which are routed down link DL packets through DL flows to the downlink steps where first slices are chosen 211 and then flows are chosen 212. The chosen downlink flows and slices are passed on to the frame scheduler. Uplink UL flows and slices in the NVS are responsive to bandwidth requests per flow from the frame scheduler where slices are first chosen 211 and then flows are chosen 212. The exemplary NVS of FIG. 2 depicts three slices: Slice 1, Slice 2 and Slice 3. Downlink packets are directed from Slice 1 to the classifier and UL packets are directed from the frame scheduler to Slice 3.

The NVS enables aggregating information flows into sets and allocating resources to each set in a combined fashion. Hereafter, each information flow set is referred to as a "slice". The inventive network virtualization substrate allows effective virtualization of a base station to provide (1) isolation across slices, (2) efficient resource utilization on the physical base station, and (3) customization within a slice such as slice-specific flow management or application optimizations.

The NVS achieves "combined" allocation of resources to flows within each slice, and isolation across slices using a two-step schedule. Reference 210 shows a slice reservations and utility functions aspect, reference 211 and reference 212 identify downlink and uplink slices and flows, and reference 213 shows a DL/UL flow management configuration aspect.

Referring again to the slice reservations and utility functions 210 aspect of the invention, the NVS lets each slice specify aggregate reservations for uplink and downlink directions that are used by the slice scheduler to choose the best slice at each instant of time. Slices may request reservations in terms of resources (slots in terms of frequency, time or codes as in CDMA), or bandwidth. The slice reservations and utility functions 210 provides a way of specifying customized reservations per slice (group of flows) on a base station simultaneously. No such provision exists today in base stations.

The NVS's two-step scheduler selects a slice at the first step 211, and a flow within the slice at the next step 212. The NVS retains the notion of uplink and downlink service flows as in the traditional cellular basestation schedulers, and maintains per flow queues. Each flow is identified by [flowID, slice ID] tuple. The NVS can use a variety of "concave" utility functions to define the resource allocation strategy across slices. These utility functions may achieve optimal resource allocation across slices even in the mixed presence of slices with bandwidth and resource based reservations.

In one instantiation, for choosing a slice 211, the NVS can use the following method. At each instant of time, among the set of slices that have flows with packets, the slice with maximum weight is picked, where the weight is computed as follows:

If the slice j requested bandwidth-based reservation, $Wt\_j$=reserved_bandwidth/average_bandwidth_already_achieved Else if the slice j requested resource-based reservation, $Wt\_j$=reserved_slots/average_slots_already_achieved.

The average of bandwidth or slots can be computed as a long-term average, an exponentially weighted moving average or an interval based average.

The above method ensures that we can optimally support slices with resource-based reservations and bandwidth based reservations simultaneously on a base station. The slice scheduler then emulates custom flow management functions as specified by 213 and chooses a flow from the flows of the chosen slice.

Referring again to the DL/UL Flow Management Configuration 213 in FIG. 2, to ensure that each slice can employ custom flow management functions for choosing the order of packets to be transmitted, the NVS lets each slice determine the order in which packets of flows belonging to the slice are to be sent. However, resources have to be allocated at fine timescales, such as on a per-packet or per-MAC-frame basis for efficiency; so this aspect should be taken into consideration for choosing the right approach.

Several approaches can be used for giving slices the flexibility to specify flow management functions. For example, the NVS may provide a variety of commonly employed schedulers that a slice can choose from. Alternately, the NVS may provide flow-level feedback to the slice to perform flow scheduling itself, and the slice may place a tag on each packet of the flow with a virtual time that monotonically increases. In this case, the NVS picks from the flows of the slice, the packet at the head of the flow queue that has the least virtual time.

From the foregoing, it can be seen that the inventive network virtualization is a low complexity solution for the virtualization problem. Furthermore, the inventive network virtualization substrate NVS allows the individual virtual network operators to run custom resource management functions easily, a feature that is currently non-existent. The slice reservations and utility functions 210 provide a way of specifying customized reservations per slice (group of flows) on a basestation simultaneously. No such provision exists today in basestations. The DL/UL flow management configuration 211 provides enables optimal resource allocation even in the presence of bandwidth-based and resource based reservations simultaneously. The downlink and uplink slice and then flow selections 212 and 213 enable the NVS to support customized flow management functions as specified by the slices. Heretofore, there are no virtualized basestation systems that support multiple customized and dynamically installable/configurable flow management functions simultaneously.

The NVS as implemented in accordance with the invention will lead to: 1) The ability to create custom virtual basestations and networks; 2) New business models such as isolated corporate bundles, services with reserved network resources; and 3) Better management through ease of programmability, and incremental innovation and evolution of basestations.

Figure 3:
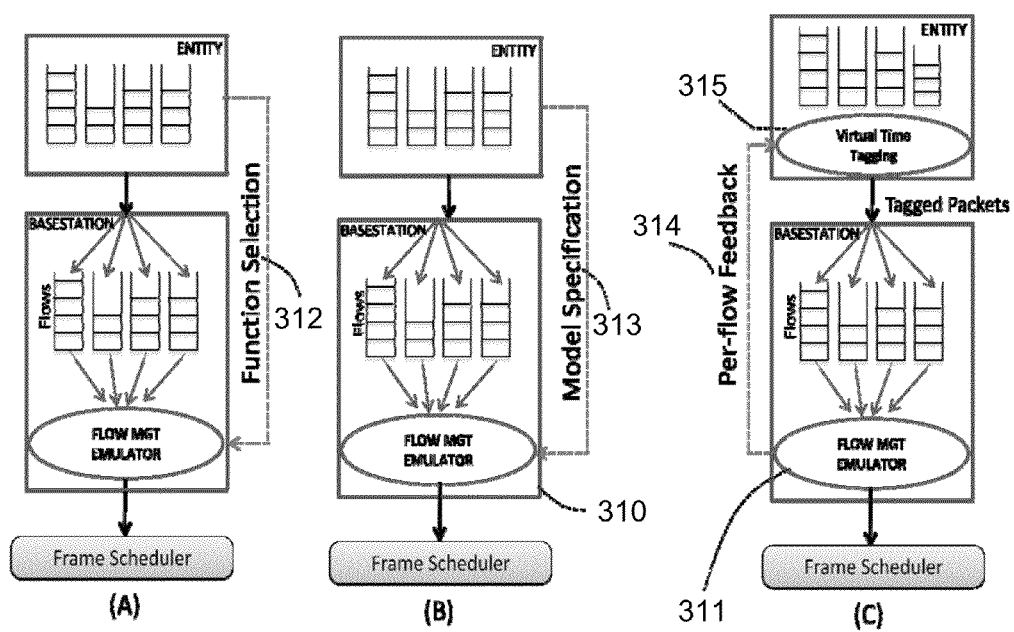
FIG. 3 is an exemplary diagram of a customizable and adaptive flow management emulator.

Three approaches are defined in a customizable and adaptive flow-management emulator (CAFE) for giving entities the flexibility to specify flow scheduling that has different merits and demerits: function selection 312, model specification 313, and virtual time tagging 314 in FIG. 3.

With the Function Selection 312 approach, the inventive CAFE provides a variety of commonly employed schedulers that an entity can choose from. This approach may be very attractive to entities like MVNOs, corporate networks, or service providers with no expertise in wireless networking and prefer relying on the basestation to take care of flow management. This approach, however, is not suitable for evaluating new innovations.

With the Model Specification 313 approach, the inventive CAFE provides a programming interface to specify on a per-class or per-flow basis, the weight distribution as a function of the average rate already achieved, modulation and coding scheme, packet loss, the flow's minimum reserved rate and maximum sustained rate. The weight distribution is sent as a set of discrete tuples that are stored in a table in the basestation that CAFE looks-up during flow scheduling. CAFE emulates flow scheduling by choosing the flow(s) in the decreasing order of the weights. For flows with the same weight, CAFE chooses the flow with lower average rate achieved. This approach is general in that a large number of flow schedulers such as RR, WRR and proportional fair, can be specified as a set of discrete tables. However, this approach has a drawback; flow management functions for which the set of weights cannot be represented offline and/or depends on online information such as current allocation of other flows, current channel conditions, etc. cannot be emulated by this approach.

With the per-flow feedback 314 approach, the inventive CAFE provides flow-level feedback to the entity to perform flow scheduling itself, and place a tag on each packet of the flow with a virtual time that monotonically increases. The per-flow feedback includes average rate achieved, packet loss, MCS etc. In this case, CAFE picks from the flows, the packet among all packets at the heads of the flow queues that has the least virtual time. While this approach enables arbitrary flow schedulers to be defined, the drawback of this approach is that the feedback interval impacts the scheduling decisions and may require the entity to be as close to the basestation as possible. Both Model Specification and Virtual Time Tagging may execute within the basestation as Virtual Machines or loadable modules or external entities such as gateways or routers (e.g., ASN gateway or CSN for WiMAX).

When using the Virtual Time Tagging 315 approach for the CAFE, the entity needs to take care of flow scheduling and tagging each packet with the correct virtual time so that CAFE sends out the packets in the desired order. The flow scheduler in the entity makes use of the per-flow feedback from the basestation in order to schedule the order of the packets.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A network virtualization method in a wireless communication system, the method comprising:
   aggregating sets of uplink and downlink flows on a cellular basestation into groups;
   allocating wireless resources to each of the sets as a respective basestation slice; and
   enabling each of the sets of flows to be under a distinct administrative entity,
   wherein the wireless communication system is configured so that said administrative entity can request reservations for aggregate flows in terms of selected one of bandwidth and resources,
   wherein said cellular basestation allows optimal co-existence of said reservations using normalized weight functions per slice that are computed differently for resource-based and bandwidth-based types of said reservations,
   wherein said basestation enables said slices to perform customized slices, within each of which customization of resource allocation of each flow is provided for customized flow management functions and application optimizations, and
   wherein the customized flow management functions comprise a virtual time tagging, a scheduler selection to provide a variety of commonly employed schedulers that said administrative entity can choose one from and a model specification to provide a programming interface to specify weight distribution on a per-class or per-flow basis.

2. The method of claim 1, wherein said customized flow management functions can be enabled external to said basestation, within said basestation as a virtual machine, or as a loadable module.

3. The method of claim 1, wherein said co-existence is achieved, when at each time instant, said basestation schedules said slice with maximum weight.

4. The method of claim 3, wherein for said resource-based reservations, said weight is based on at least one of reserved slots, average slots and a comparison of said reserved slots to said average slots, where slots are a measure of resources, the measure of resources being a frequency subchannel or a time slot.

5. The method of claim 3, wherein for bandwidth-based said reservations, said weight is based on at least one of a reserved bandwidth, an average bandwidth and a comparison of said reserved bandwidth to said average bandwidth.

* * * * *